United States Patent [19]

Yamasaki et al.

[11] Patent Number: 5,354,517
[45] Date of Patent: Oct. 11, 1994

[54] PROCESS FOR THE PREPARATION OF SUBSTRATES FOR OPTICAL DISK

[75] Inventors: Kazuyuki Yamasaki, Tokyo; Takehiko Kitamura, Chiba, both of Japan

[73] Assignees: Mitsui Petrochemical Industries, Ltd.; Sumitomo Heavy Industries, Ltd., both of Tokyo, Japan

[21] Appl. No.: 54,033

[22] Filed: Apr. 27, 1993

Related U.S. Application Data

[63] Continuation of Ser. No. 894,347, Jun. 4, 1992, abandoned.

[30] Foreign Application Priority Data

Jun. 5, 1991 [JP] Japan ................. 3-134462

[51] Int. Cl.⁵ .............................. B29C 45/73
[52] U.S. Cl. ................. 264/1.1; 264/328.16
[58] Field of Search .............. 264/328.16, 1.1, 106, 264/328.1, 331.13, 331.15

[56] References Cited

U.S. PATENT DOCUMENTS

| | | | |
|---|---|---|---|
| 4,921,205 | 5/1990 | Drew, Jr. et al. | 264/2.7 |
| 5,154,958 | 10/1992 | Namba et al. | 428/64 |

FOREIGN PATENT DOCUMENTS 58-176204 10/1983 Japan.

*Primary Examiner*—Jill L. Heitbrink
*Attorney, Agent, or Firm*—Sherman and Shalloway

[57] ABSTRACT

A process for the preparation of substrate for optical disk characterized in that pellets of 4-methyl-1-pentene polymer or copolymer having a melt flow rate (MFR), as measured according to ASTM D1238 under a load of 5 kg and at a temperature of 260° C., of 240–1200 g/10 min, and a melting point as measured by means of DSC of 234°–240° C., are injection molded into the substrate under the conditions where a temperature of at least part of a cylinder is 320°–370° C. and a mold temperature is not more than 55° C.

7 Claims, 1 Drawing Sheet

5,354,517

PROCESS FOR THE PREPARATION OF SUBSTRATES FOR OPTICAL DISK

This is a continuation of application Ser. No. 07/894,347 filed Jun. 4, 1992 now abandoned.

FIELD OF THE INVENTION

This invention relates to a process for the preparation of substrates for optical disk (disc) and more particularly to the process for the preparation of substrates for optical disk composed of 4-methyl-1-pentene homopolymer or 4-methyl-1-pentene/α-olefin copolymer excellent in transferability.

BACKGROUND OF THE INVENTION

Because of their large memory capacity and portability, optical disks are widely used in the field of information recording such as CD, LD, optical disk of write once type and MO disk for sound recording and video tape recording.

The optical disks are prepared by injecting a starting polymer by means of an injection molding machine into a mold having a stamper to form a substrate for optical disk having pits or tracks transferred by the stamper onto the surface of the substrate, and forming on the substrate an optical recording layer, or an optical recording layer and reflecting layer (metallic layer) and further a protecting layer, or by simultaneous formation by injection molding of a substrate and formation thereon of information bits, followed by formation thereon of a reflecting layer and, if necessary, a protective layer. In order to obtain optical disks having good recording and reproducing sensitivities, it is necessary to reproduce faithfully minute unevenness of the surface of the stamper on a substrate surface at the time of molding said substrate. Furthermore, substrates for optical disk as referred to above are required to have such various characteristics that they have excellent transparency, less refringence, no distortion at the time of molding, excellent dimensional stability without causing warp, excellent accessibility for metallization or excellent adherence property for organic film, excellent heat resistance and moisture resistance.

In recent years, there has been a growing demand in the art for optical disks having a larger memory capacity. In order to obtain an increased memory capacity in optical disks having substrates identical in diameter with each other, it is necessary to enhance recording density in the substrate by narrowing a pitch of track or pit. In order to prepare optical disks having high recording density as mentioned above, it is required to use specific polymer or copolymers as starting materials for the optical disks and employ a specific process for the preparation of substrates for optical disk according to the present invention.

OBJECT OF THE INVENTION

The present invention has been made in view of the prior art as mentioned above, and an object of the invention is to provide processes for the preparation of substrates for optical disk composed of 4-methyl-1-pentene polymers, excellent in transferability and less in warp.

SUMMARY OF THE INVENTION

The process for the preparation of substrates for optical disk according to the present invention is characterized in that pellets of 4-methyl-1-pentene polymer or copolymer having
 a melt flow rate (MFR), as measured according to ASTM D1238 under a load of 5 kg and at a temperature of 260° C., of 240–1200 g/10 min, and
 a melting point as measured by means of DSC of 234°–240° C.,
are injection molded into the substrates under the conditions where a temperature of at least part of a cylinder is 320°–370° C. and a mold temperature is not more than 55° C.

The 4-methyl-1-pentene copolymers as referred above, from which the substrates for optical disk of the invention are molded, preferably contain 94–99.5% by weight of recurring units derived from 4-methyl-1-pentene and 6–0.5% by weight of recurring units derived from α-olefin, preferably α-olefin, of 4–24 carbon atoms.

DETAILED DESCRIPTION OF THE INVENTION

Figure 1:
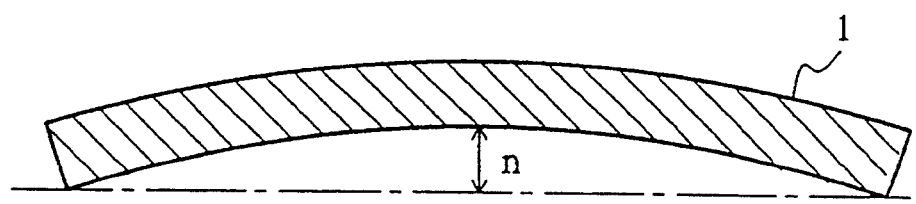
FIG. 1 is a view illustrating the method of measuring an amount of warp of the optical disk.

In connection with the process for the preparation of substrates for optical disk of the present invention, 4-methyl-1-pentene polymer or copolymers used in said process are first illustrated hereinafter.

Resins used for the substrates of the invention include a 4-methyl-1-pentene polymer, preferably a homopolymer of 4-methyl-1-pentene, or 4-methyl-1-pentene copolymers comprising 4-methyl-1-pentene and α-olefin (preferably α-olefin of 4–24 carbon atoms), preferably copolymers of 4-methyl-1-pentene and α-olefin of 4–24 carbon atoms comprising at least 94% by weight of recurring units derived from 4-methyl-1-pentene. In order to obtain such substrates for optical disk excellent in transferability as aimed at in the invention, however, it is desirable to use 4-methyl-1-pentene/α-olefin copolymers, in particular, comprising 94–99.5% by weight, preferably 96–99.5% by weight, of recurring units derived from 4-methyl-1-pentene and 6–0.5% by weight, preferably 4–0.5% by weight, of recurring units derived from α-olefin of 4–24 carbon atoms.

The term "4-methyl-1-pentene polymer" in the specification means a homopolymer of 4-methyl-1-pentene and a copolymer of 4-methyl-1-pentene and a small amount of monomer other than α-olefins.

The term "4-methyl-1-pentene copolymer (4-methyl-1-pentene/α-olefin copolymer)" in the specification means a copolymer of 4-methyl-1-pentene and α-olefin or a copolymer of 4-methyl-1-pentene, α-olefin and a small amount of monomer other than α-olefin.

The copolymer of 4-methyl-1-pentene and α-olefin may include a small amount of recurring units derived from monomer other than α-olefin.

Examples of the copolymerizable monomer other than α-olefin include concretely butadiene, dicyclopentadiene, ethylidenenorbornene, methyl acrylate, methyl methacrylate, ethyl acrylate, ethyl methacrylate, etc.

Examples of α-olefin include α-olefins having not less than 2 carbon atoms, preferably α-olefins of 4–24 carbon atoms.

The above-mentioned α-olefin includes concretely ethylene, propylene, 1-butene, 1-pentene, 1-hexene, 1-heptene, 1-octene, 1-decene, 1-tetradecene, 1-hexadecene, 1-octadecene and 1-eicosene. Of these α-olefins exemplified above, preferred are those having 6–18 carbon atoms, and particularly useful are 1-decene, 1-hexadecene and 1-octadecene. These α-olefins exemplified may be used whether singly or in combination of two or more.

Such 4-methyl-1-pentene homopolymer or 4-methyl-1-pentene/α-olefin copolymers as mentioned above may be prepared, for example, by using known catalysts and methods as will be mentioned below.

That is, the 4-methyl-1-pentene homopolymer or 4-methyl-1-pentene/α-olefin copolymers are obtained by the homopolymerization of 4-methyl-1-pentene or copolymerization of 4-methyl-1-pentene and the aforesaid α-olefin at a temperature of about 20°–100° C. in the presence of a polymerization catalyst formed from (A) a highly active titanium catalyst component,
(B) an organometallic compound catalyst components, and
(C) an organosilicon compound catalyst component represented by the following general formula, $$R_n Si(OR')_{4-n}$$

wherein R and R' are each a hydrocarbon radical, and $0 < n < 4$.

In the present invention, moreover, there may also be used as the aforesaid 4-methyl-1-pentene/α-olefin copolymer those obtained by particularly degradation of 4-methyl-1-pentene homopolymers high in MFR or 4-methyl-1-pentene/α-olefin copolymers by way of thermal decomposition. There may also be used a blend of the homopolymer and copolymer.

In the case that the substrates are composed of the blend of the homopolymer and copolymer, the 4-methyl-1-pentene/α-olefin copolymer is preferably used in an amount of more than 0.5% by weight, more preferably more than 30% by weight, most preferably more than 40% by weight and the 4-methyl-1-pentene homopolymer is used preferably in an amount of less than 99.5% by weight, more preferably less than 70% by weight, most preferably less than 60% by weight, based on the total weight of the 4-methyl-1-pentene/α-olefin copolymer and the 4-methyl-1-pentene homopolymer.

Pellets of such a 4-methyl-1-pentene homopolymer or 4-methyl-1-pentene copolymers (4-methyl-1-pentene/α-olefin copolymers) used in the invention are desirous to have a melt flow rate (MFR), as measured according to ASTM D 1238 under a load of 5 kg and at a temperature of 260° C., of 240–1200 g/10 min, preferably 240–1000 g/10 min, more preferably 300–950 g/10 min and most preferably 350–900 g/10 min, and a melting point by means of DSC of 234°–240° C., more preferably 235°–239° C. The above-mentioned homopolymer or copolymers used in the invention preferably have a density of 0.830–0.835 g/cm³, preferably 0.831–0.834 g/cm³. The above-mentioned homopolymer or copolymers preferably have a number average molecular weight (Mn) of (15,000–100,000) measured by gel permeation chromatography (GPC) method (solvent: o-dichlorobenzene, 140° C.), and preferably have a molecular weight distribution of 2.3–5.0.

The above-mentioned melting point is determined by the following procedure using a differential scanning calorimeter. This is, using DSC Model II of Perkin-Elmer Co., about 3 mg of a sample of the polymer is wrapped around an aluminum plate, 4 mm×4 mm×0.2 mm, to constrain the direction of orientation of the sample, and the sample thus wrapped is placed in an aluminum pan used as a sample holder and an empty aluminum pan is used as a reference holder, and a heat balance of each of these two samples are recorded. These samples are held at 30° C. for about 1 minute, the temperature is then elevated at a rate of 10° C./min up to 250° C., and a maximum endothermic peak position of each sample recorded in this measurement is taken as a melting point thereof.

Optical disk substrates composed of the 4-methyl-1-pentene homopolymer or 4-methyl-1-pentene/α-olefin copolymers obtained in the invention preferably have a density of 0.830–0.835 g/cm³, preferably 0.831–0.834 g/cm³, and a melt flow rate (MFR), as measured according to ASTM D 1238, of 300–3000 g/10 min, preferably 350–2000 g/10 min.

Optical disk substrates composed of the 4-methyl-1-pentene homopolymer or 4-methyl-1-pentene/α-olefin copolymers obtained in the invention also preferably have a number average molecular weight (Mn) of 10,000–80,000 measured by GPC method (solvent: o-dichlorobenzene, 140° C.) and preferably have a molecular weight distribution of 2.0–5.0.

Such 4-methyl-1-pentene homopolymer or 4-methyl-1-pentene/α-olefin copolymers used in preparing the optical disk substrates as mentioned above have such characteristics that they are excellent in heat resistance, transparency, melt flow characteristics and precision molding workability and that they are hard to cause distortion at the time of molding and working.

The 4-methyl-1-pentene/α-olefin copolymers may be used singly and can also be used in the form of composition comprising the 4-methyl-1-pentene/α-olefin copolymer and 4-methyl-1-pentene polymer.

The above-mentioned copolymers or the composition may be incorporated, if necessary, with various additives such as heat stabilizers, weathering stabilizers, hydrochloric acid absorbers and antistatic agents.

In the present invention, substrates for optical disk are molded from the copolymers or compositions mentioned above.

The substrates for optical disk according to the invention are obtained by injection molding of the above-mentioned polymer or copolymer or composition under such conditions that the temperature of at least a part of the cylinder is usually 320°–370° C., preferably 330°–355° C., more preferably 330°–350° C. and most preferably 335°–350° C., and the mold temperature is not more than 55° C., preferably 10°–50° C.

The cooling time employed in the injection molding is preferably 5.0–11 seconds, more preferably 6.0–8.0 seconds, and the molding cycle is 10.0–18.0 seconds, preferably 12.0–18.0 seconds, more preferably 13.0–15.0 seconds.

The optical disk substrates thus obtained are desirous to have a thickness of usually 0.1–5 mm, preferably 0.5–1.5 mm.

Using the substrates for optical disk obtained by the present invention, optical disks may be prepared, for example, by forming on the substrate a magnetooptical recording layer comprising 3d transition metals and rare earth metals such as Fe-Co-Tb layer, Fe-Co-Gd layer or the like, or an optical recording layer of the write once type such as Te-C-H layer, Te-Cr layer or the like, or forming information pits on the substrate simultaneously with the molding of said substrate (for example as read only type optical recording medium), and forming, if necessary, a reflecting layer or a reflecting layer and a protective layer, on the substrate.

Though not particularly limited, the reflecting layer may be any layer comprising of a metal such as Al, Cr, Au, Ag or Cu. This reflecting layer is desirous to have a thickness of 500–1000 Å, preferably 800–1000 Å.

The protective layer includes those composed of ultraviolet-curing resin, epoxy resin, methacrylate resin, silicon nitride (SiNx), silicon carbide (SiCx) and aluminum nitride (AlN). This protective layer is desirous to have a thickness of 3–7 μm, preferably 5–7 μm.

These recording layer, reflecting layer and protecting layer may be formed on the substrate, for example, by the known method, such as vacuum deposition, sputtering or spin coat process.

According to the process for the preparation of substrates for optical disk of the present invention, there are obtained the substrates for optical disk having particularly good transferability, because a low viscosity 4-methyl-1-pentene polymer or copolymer molten at a high temperature in the cylinder is charged in a short time into a mold kept at a low temperature, whereby the patterns of a stamper attached to the mold is faithfully transferred to the surface of the substrate being molded and stamped by said stamper so as to form grooves having a uniform depth on the substrate. Because of a low mold temperature employed in the present process, the molding cycle can be shortened and thereby to improve productivity. Furthermore, it is possible to prevent the 4-methyl-1-pentene polymer or copolymer from heat deterioration during the process, because the retention time of the resin in the cylinder can be shortened and, moreover, the substrate for optical disk obtained thereby is hard to warp and found to be excellent in dimentional stability.

EFFECT OF THE INVENTION

In the process for the preparation of substrates for optical disk according to the present invention, pellets obtained from 4-methyl-1-pentene homopolymer or 4-methyl-1-pentene/α-olefin copolymers, especially 4-methyl-1-pentene/α-olefin copolymers comprising 94–100% by weight, preferably 94–99.5% by weight (preferably 96–99.5% by weight) of recurring units derived from 4-methyl-1-pentene and 6–0.5% by weight, preferably 4–0.5% by weight of recurring units derived from α-olefin of 4–24 carbon atoms, having a melt flow rate (MFR), as measured according to ASTM D 1238, of 240–1200 g/10 min, and melting point, as measured by DSC, of 234°–240° C. are used as the starting resin pellets, and formed by injection molding into substrate forms at a cylinder temperature of 320°–370° C. and a mold kept at the temperature of not more than 55° C., and hence the substrates for optical disk obtained thereby are found to be particularly excellent in transferability. The substrates for optical disk molded by such a process as mentioned above are hard to warp, excellent in dimentional stability and heat resistance and, moreover, do not form flow marks on the surface, are excellent in transparency and small in birefringence.

The process for the preparation of substrates for optical disk according to the present invention may be widely utilized as a process for preparing transparent substrates such as CD, MD, CD-ROM, LD or MO disk and disk of the write once type.

The process for the preparation of substrates for the optical disk of the present invention will be illustrated below in more detail with reference to examples, but it should be construed that the invention is in no way limited to those examples.

In the invention the warp and transferability of the optical disks obtained are evaluated by the following manner.

[Warp]

As shown in FIG. 1, the distance (n) between a plane contacting with the outer periphery of the concave of the optical disk and the center of the substrate was measured, and the distance (n) thus measured was taken as a warp (mm) of the optical disk.

[Transferability]

Transferability of the optical disk substrate was evaluated by measuring a modulation ($I_3/I_{Top}$ and $I_{11}/I_{Top}$) of the optical disk.

That is, a reflecting layer and a protective layer are formed in this order on the surface of a substrate for optical disk, said substrate having pits transferred previously. The optical disk thus obtained is irradiated with a laser beam for reproduction to measure an amount of light ($I_{Top}$) of the laser beam reflected and backed from the optical disk on which no pit is formed, an amount of light ($I_3$) of of the laser beam reflected and backed from the pit having the shortest pit length, and an amount of light ($I_{11}$) of the laser beam reflected and backed from the pit having the longest pit length, thereby obtaining $I_3/I_{Top}$ and $I_{11}/I_{Top}$. Because values of $I_3$ and $I_{11}$ become higher as the substrate is higher in transferability, it follows that the optical disk is excellent in transferability as the values of $I_3/I_{Top}$ and $I_{11}/I_{Top}$ become higher.

In general, $I_3/I_{Top}$ is about 40% and $I_{11}/I_{Top}$ is about 60%.

EXAMPLE 1

A substrate for CD having a thickness of 1.2 mm and a diameter of 120 mm φ was prepared by injection molding a 4-methyl-1-pentene/α-olefin copolymer comprising 98% by weight of 4-methyl-1-pentene and 2% by weight of n-decene (1-decene) (MFR:400 g/10 min measured according to ASTM D 1238, a melting point, as measured by DSC, of 235° C., Mn: 47000, molecular weight distribution 2.38 measured by GPC, solvent: o-dichlorobenzene, 140° C.) into a disk form by means of an injection molding machine (Sumitomo-Netstal DISK 5 M III of Sumitomo Heavy Industries, Ltd.) under such conditions that a cylinder highest temperature is 350° C., a mold temperature is 40° C., a cooling time is 5 seconds, a screw revolution is 200 rpm and a molding cycle is 13 seconds.

The substrate thus obtained was metallized on the surface by the sputtering method with Al to a thickness of 700 Å, and a protective layer composed of an acrylate ultraviolet curing resin (DAICURE CLEAR SD-17, Product of Dainihon Ink & Chemicals Inc.) was formed by the spin coat method on the Al layer to a thickness of 7 μm. Characteristics of the optical disk thus obtained were measured to obtain results as shown in Table 1.

COMPARATIVE EXAMPLE 1

A substrate for CD having a thickness of 1.2 mm and a diameter of 120 mm φ was prepared by injection molding a 4-methyl-1-pentene resin (TPX-RT 18 of Mitsui Petrochemical Industries, Ltd., MFR:26 g/10 min, a melting point, as measured by DSC, of 231° C.) into a disk form by means of the same injection molding machine as used in Example 1 and under the same conditions as in Example 1 except that the cylinder temperature used was changed to 300° C. and the mold temperature was changed to 60° C.

The substrate thus obtained was metallized in the same manner as in Example 1 to obtain an optical disk. Characteristics of the thus obtained optical disk were measured to obtain results as shown in Table 1. Because of the small MFR of the resin used, the warp of the optical disk was large, and was not usable as optional disk.

COMPARATIVE EXAMPLE 2

Using the same injection molding machine as used in Example 1, a polycarbonate for disk (MFR:52 g/10 min) was molded into a disk form at a cylinder temperature of 335° C., a mold temperature of 85° C., and using a cooling time of 5 seconds, a screw revolution of 200 rpm and a molding cycle of 9 seconds. The substrate thus obtained was metallized in the same manner as in Example 1 to obtain an optical disk. Characteristics of the optical disk thus obtained were measured to obtain results as shown in Table 1.

TABLE 1

|  | $I_3/I_{Top}$ | $I_{11}/I_{Top}$ | Warp (mm) |
| --- | --- | --- | --- |
| Example 1 | 63 | 79 | 0.3 |
| Comp. Example 1 | Not measurable | Not measurable | 11 |
| Comp. Example 2 | 55 | 73 | 0.3 |

EXAMPLE 2

A substrate for CD having a thickness of 1.2 mm and a diameter of 120 mm $\phi$ was prepared by injection molding a 4-methyl-1-pentene/α-olefin copolymer comprising 98.5% by weight of 4-methyl-1-pentene and 1.5% by weight of n-hexadecene (1-hexadecene) (MFR:420 g/10 min measured according to ASTM D 1238), a melting point, as measured by DSC, of 235° C.), into a disk form by means of an injection molding machine (Sumitomo-Netstal DISK 5 M III of Sumitomo Heavy Industries, Ltd.) under such conditions that a cylinder temperature is 345° C., a mold temperature is 50° C., a cooling time is 5 seconds, a screw revolution is 200 rpm and a molding cycle is 10 seconds.

The substrate thus obtained was metallized on the surface by the sputtering method with Al to a thickness of 700 Å, and a protective layer composed of an acrylate ultraviolet curing resin (DAICURE CLEAR SD-17, Product of Dainihon Ink & Chemicals Inc.) was formed by the spin coat method on the Al layer to a thickness of 7 μm. Characteristics of the optical disk thus obtained were measured to obtain results as shown in Table 2.

EXAMPLE 3

A substrate for CD having a thickness of 1.2 mm and a diameter of 120 mm $\phi$ is prepared by injection molding a 4-methyl-1-pentene homo-polymer (MFR:490 g/10 min measured according to ASTM D 1238, a melting point, as measured by DSC, of 235° C.) into a disk form by means of an injection molding machine (Sumitomo-Netstal DISK 5 M III of Sumitomo Heavy Industries, Ltd.) under such conditions that a cylinder temperature is 355° C., a mold temperature is 43° C., a cooling time is 5 seconds, a screw revolution is 200 rpm and a molding cycle is 13 seconds.

The substrate which is thus obtained is metallized on the surface by the sputtering method with Al to a thickness of 700 Å, and a protective layer composed of an acrylate ultraviolet curing resin (DAICURE CLEAR SD-17, Product of Dainihon Ink & Chemicals Inc.) is formed by the spin coat method on the Al layer to a thickness of 7 μm. Characteristics of the optical disk which is thus obtained are measured to obtain results as shown in Table 2.

EXAMPLE 4

A substrate for CD having a thickness of 1.2 mm and a diameter of 120 mm $\phi$ was prepared by injection molding a 4-methyl-1-pentene/α-olefin copolymer comprising 98% by weight of 4-methyl-1-pentene and 2% by weight of n-decene (MFR:800 g/10 min measured according to ASTM D 1238, a melting point, as measured by DSC, of 235° C.) into a disk form by means of an injection molding machine (Sumitomo-Netstal DISK 5 M III of Sumitomo Heavy Industries, Ltd.) under such conditions that a cylinder highest temperature is 350° C., a mold temperature is 40° C., a cooling time is 5 seconds, a screw revolution is 200 rpm and a molding cycle is 18 seconds.

The substrate thus obtained was metallized on the surface by the sputtering method with Al to a thickness of 700 Å, and a protective layer composed of an acrylate ultraviolet curing resin (DAICURE CLEAR SD-17, Product of Dainihon Ink & Chemicals Inc.) was formed by the spin coat method on the Al layer to a thickness of 7 μm. Characteristics of the optical disk thus obtained were measured to obtain results as shown in Table 2.

TABLE 2

|  | $I_3/I_{Top}$ | $I_{11}/I_{Top}$ | Warp (mm) |
| --- | --- | --- | --- |
| Example 2 | 59 | 81 | 0.3 |
| Example 3 | 60 | 75 | 0.4 |
| Example 4 | 60 | 82 | 0.3 |

As is clear from Table 1, it is understood that the optical disk having the substrate obtained by the process of the present invention is high in value of both $I_3/I_{Top}$ and $I_{11}/I_{Top}$ and accordingly the process for the preparation of substrates for optical disk of the present invention is capable of giving substrates excellent in transferability.

What is claimed is:

1. A process for the preparation of a substrate for an optical disk comprising the steps of
    (A) melting pellets of 4-methyl-1-pentene polymer or copolymer having a melt flow rate, MFR, of about 240 to about 1200 g/10 min as measured according to ASTM D1238 under a load of 5 kg at a temperature of 260° C., and a melting point of 234° to 240° C., as measured by a differential scanning calorimeter,
    (B) retaining the molten polymer or copolymer in a container heated at least in part from 320° to 370° C.; and
    (C) injection molding the molten polymer or copolymer of step (B) into a mold having a temperature of not more than 55° C.

2. The process as claimed in claim 1 wherein the 4-methyl-1-pentene copolymer is a copolymer of 4-methyl-1-pentene and α-olefin.

3. The process as claimed in claim 1 or 2 wherein in step (B) the temperature is in the range of from 335° to 350° C. and in step (C) the mold temperature is in the range of from 10°–50° C.

4. A process for the preparation of a substrate for an optical disk comprising the steps of
   (A) melting pellets of 4-methyl-1-pentene copolymer comprising 94 to 99.5% by weight of recurring units derived from 4-methyl-1-pentene and 6 to 0.5% by weight of recurring units derived from α-olefin having from 4 to 24 carbon atoms and a melt flow rate, MFR, of from about 240 to 1200 g/10 min as measured according to ASTM D1238 under a load of 5 kg and at a temperature of 260° C. and a melting point of from about 234° to 240° C. as measured by a differential scanning calorimeter;
   (B) retaining the molten copolymer in a container heated at least in part to a temperature of from 320° to 370° C.; and
   (C) injection molding the copolymer of step (B) into a mold having a temperature of not more than 55° C.

5. The process as claimed in claim 4 wherein in step (B) the temperature is in the range of from 320°–370° C. and in step (C) the mold temperature is in the range of from 10°–50° C.

6. The process as claimed in claim 4 wherein pellets of a homopolymer of 4-methyl-1-pentene are used.

7. The process as claimed in claim 6 wherein in step (B) the temperature is in the range of from 335°–350° C. and in step (C) the mold temperature is in the range of from 10°–50° C.

* * * * *